US011175153B2

(12) United States Patent
Pham et al.

(10) Patent No.: US 11,175,153 B2
(45) Date of Patent: Nov. 16, 2021

(54) PEDESTRIAN AND VEHICLE ROUTE OPTIMIZATION (71) Applicant: Toyota Motor North America, Inc., Plano, TX (US)

(72) Inventors: Alex Pham, San Jose, CA (US); Jerry Tipper, Plano, TX (US); Jacob Morrow, Carrollton, TX (US); Nutonya Lynn Parker, Dallas, TX (US); Ratan Kumar Gone, Plano, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 185 days.

(21) Appl. No.: 16/546,142

(22) Filed: Aug. 20, 2019

(65) Prior Publication Data
US 2021/0055122 A1 Feb. 25, 2021

(51) Int. Cl.
G08B 1/00 (2006.01)
G01C 21/34 (2006.01)
H04W 4/029 (2018.01)
G08G 1/01 (2006.01)
G01C 21/36 (2006.01)

(52) U.S. Cl.
CPC ..... G01C 21/3492 (2013.01); G01C 21/3461 (2013.01); G01C 21/3694 (2013.01); G08G 1/0145 (2013.01); H04W 4/029 (2018.02)

(58) Field of Classification Search
CPC .............................. A61J 7/0481; G16H 40/67

USPC .......... 340/309–16, 539.1, 539.12, 905, 907, 340/995.19, 997, 309.16; 701/117, 209, 701/211, 423
See application file for complete search history.

(56) References Cited

U.S. PATENT DOCUMENTS

| | | | |
|---|---|---|---|
| 2008/0218405 A1* | 9/2008 | Eckhart ................... | H04W 4/18 342/146 |
| 2008/0319648 A1* | 12/2008 | Poltorak .............. | G08G 1/0969 701/423 |
| 2011/0224893 A1* | 9/2011 | Scofield ................. | G08G 1/052 701/119 |
| 2017/0098372 A1* | 4/2017 | Eilertsen .......... | G08G 1/096775 |
| 2018/0173219 A1* | 6/2018 | Lee ....................... | G05D 1/0088 |
| 2019/0049264 A1* | 2/2019 | Malkes .................... | G08G 1/07 |

* cited by examiner

Primary Examiner — Tai T Nguyen
(74) Attorney, Agent, or Firm — Snell & Wilmer LLP (57) ABSTRACT Methods, systems, and apparatus for a route optimization system. The route optimization system includes a sensor configured to detect a location of one or more pedestrians. The route optimization system includes a processor. The processor is coupled to the sensor and configured to obtain a start location and a destination location for a vehicle or a personal device. The processor is configured to determine pedestrian traffic flow between the start location and the destination location based on the location of the one or more pedestrians. The processor is configured to determine multiple routes between the start location and the destination location and determine an optimal route based on the pedestrian traffic flow. The processor is configured to provide the optimal route to a user.

20 Claims, 5 Drawing Sheets

PEDESTRIAN AND VEHICLE ROUTE OPTIMIZATION

BACKGROUND

Field

The present disclosure relates to systems, apparatuses and methods for optimizing vehicle and/or pedestrian routes to avoid both pedestrian and vehicle traffic.

Description of the Related Art

Generally, navigation systems provide navigation instructions that navigate a vehicle or a user from a starting address to a destination address. When a vehicle navigation system navigates the vehicle from a starting address to a destination address, the vehicle navigation system may account for other vehicle traffic when suggesting one or more routes to take from the starting address to the destination address. The vehicle navigation system may suggest and/or display routes that navigate around vehicle traffic jams and/or display an estimated time of arrival that accounts for the vehicle traffic. The vehicle navigation system, however, does not account for pedestrian traffic or traffic related to other modes of transportation. For example, when a vehicle approaches an intersection, the vehicle may need to wait at the traffic light before making a right turn because there are pedestrians crossing the crosswalk, and thus, the vehicle navigation system fails to account for the waiting time necessary for the pedestrians to cross. Thus, typical vehicle navigation systems may provide a route that does not account for the pedestrian traffic that the vehicle may encounter, and as a result, the route that is provided may not be the optimal route and may result in a longer commute than another route.

Similarly, a typical navigation system that navigates a pedestrian from a starting address to a destination address does not account for any vehicle and/or pedestrian traffic flow. Thus, when the typical navigation system provides the route for the pedestrian, the typical navigation system may not provide the most optimal route, which may result in the pedestrian taking a longer amount of time to reach their destination.

Accordingly, there is a need for a system, apparatus and a method to optimize route navigation for a vehicle and/or a pedestrian to account for other forms of traffic to improve route optimization.

SUMMARY

In general, one aspect of the subject matter described in this disclosure may be embodied in a route optimization system. The route optimization system includes a sensor configured to detect a location of one or more pedestrians. The route optimization system includes a processor. The processor is coupled to the sensor and configured to obtain a start location and a destination location for a vehicle or a personal device. The processor is configured to determine pedestrian traffic flow between the start location and the destination location based on the location of the one or more pedestrians. The processor is configured to determine multiple routes between the start location and the destination location and determine an optimal route based on the pedestrian traffic flow. The processor is configured to provide the optimal route to a user.

These and other embodiments may optionally include one or more of the following features. The processor may be configured to determine a vehicle traffic flow between the start location and the destination location. The processor may be configured to determine the optimal route further based on the vehicle traffic flow. The route optimization system may include multiple user devices of multiple pedestrians. The multiple user devices may provide multiple locations of the multiple user devices. The processor may be configured to obtain the multiple locations of the multiple user devices and determine the pedestrian traffic flow further based on the multiple locations of the different users.

The sensor may be an infrastructure sensor. The infrastructure sensor may be configured to detect the location of the one or more pedestrians at a crosswalk or an intersection. The processor may be configured to determine an estimated travel time for each route of the multiple routes based on the pedestrian traffic flow. The processor may be configured to select a route among the multiple routes with the estimated travel time that is less than all the other estimated travel times of the other routes among the multiple routes.

The route optimization system 100 may include a display. The display may be configured to display the optimal route on a map overlay. The electronic control unit may be configured to render, on the display, the location of the one or more pedestrians on the map overlay.

The pedestrian traffic flow may include a direction and rate of travel of each of the one or more pedestrians based on the location of each of the one or more pedestrians. The processor may be configured to determine whether each route encounters pedestrian traffic flow based on the route and the direction and the rate of travel of each of the one or more pedestrians. The processor may be configured to calculate a total estimated travel time for each route based on the pedestrian traffic flow that is encountered.

The processor may be an electronic control unit. The sensor and the electronic control unit may be included within a vehicle and the start location and the destination location may be for the vehicle. The processor and the sensor may be included within a personal device. The personal device may be a wearable device. The start location and the destination location may be for the wearable device.

In another aspect, the subject matter may be embodied in a route optimization system. The route optimization system includes a sensor configured to detect a location of one or more pedestrians. The route optimization system includes multiple user devices of multiple pedestrians. The multiple user devices are configured to provide multiple locations of the multiple user devices. The route optimization system includes a processor. The processor is coupled to the sensor and the multiple user devices. The processor is configured to obtain a start location and a destination location for a vehicle or a user device. The processor is configured to determine pedestrian traffic flow between the start location and the destination location based on the location of the one or more pedestrians and the multiple locations of the multiple user devices. The processor is configured to determine multiple routes between the start location and the destination location. The processor is configured to determine the optimal route based on the pedestrian traffic flow and provide the optimal route to a user.

In another aspect, the subject matter may be embodied in a method. The method includes obtaining, by the processor and from multiple devices, multiple locations of the multiple devices. The method includes obtaining, by the processor, a start location and a destination location for a vehicle or a personal device. The method includes determining, by the processor, pedestrian traffic flow and vehicle traffic flow between the start location and the destination location based on the multiple locations of the multiple devices. The method includes determining, by the processor, an optimal route based on the pedestrian traffic flow and the vehicle traffic flow. The method includes providing, by the processor, the optimal route to a user.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, vehicles, apparatus and methods for optimizing vehicle and/or pedestrian traffic. Particular embodiments of the subject matter described in this disclosure may be implemented to realize one or more of the following advantages. The route optimization system monitors traffic flow, such as vehicle traffic flow and/or pedestrian traffic flow, and optimizes route planning for pedestrians and/or vehicles based on the traffic flow. The route optimization system may plan routes for pedestrians and/or vehicles from a starting location to a destination location.

When the route optimization system plans routes for vehicles, the route optimization system accounts for both vehicle traffic flow and for pedestrian traffic flow when determining an optimal route. For example, when a potential route of the vehicle from the starting location to the destination location includes a right turn, the route optimization system may determine that the potential route intersects a crosswalk that has a significant amount of pedestrian traffic, and thus, the vehicle would have to wait a significant amount of time before making the right turn.

When the route optimization system plans for routes for a pedestrian, the route optimization system would also account for both vehicle traffic flow and for pedestrian traffic flow. For example, when the potential route of the person involves crossing the street in a crosswalk, the route optimization system may determine the optimized route based on the wait times necessary to stop the vehicle cross-traffic and the number of persons trying to cross the street in any potential route. By accounting for both vehicle and/or pedestrian traffic during route planning, the route optimization system may more accurately determine an optimized route that avoids delays.

Other benefits and advantages include the capability to allow the driver of a vehicle and/or the pedestrian crossing the intersection to identify vehicle and/or persons in blind spots. The route optimization system may identify when a vehicle's route may intersect with pedestrian traffic. Similarly, the route optimization system may identify when a pedestrian's route may intersect with oncoming vehicle traffic. Thus, the route optimization system may warn the pedestrian and/or the driver of the vehicle of the traffic and prevent collisions.

Figure 1:
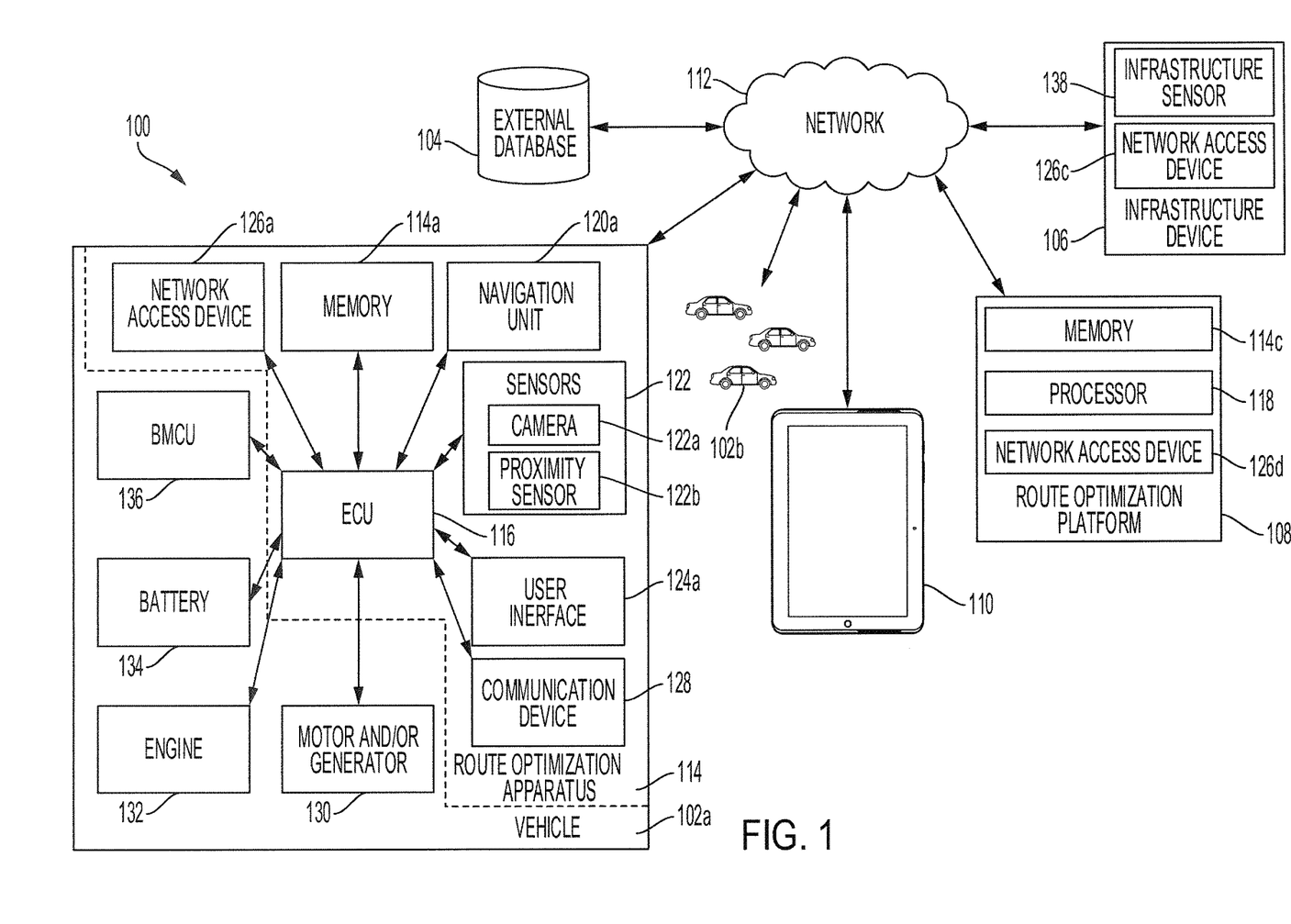
FIG. 1 is a block diagram of an example route optimization system according to an aspect of the invention.

FIG. 1 is a block diagram of a route optimization system 100. The route optimization system 100 may be retro-fitted, coupled to, include or be included within a vehicle 102a. The route optimization system 100 may couple, connect to, or include one or more other devices or entities, such as an external database 104, an infrastructure device 106, another vehicle 102b, a route optimization platform 108 and/or a user device 110, such as a smartphone, a tablet, a personal computer, a wearable device or other personal computing device. The infrastructure device 106 may be a device positioned on a building, traffic signal, traffic pole or other structure or object to monitor pedestrian traffic flow and/or vehicle traffic flow in proximity to the structure. Traffic flow may refer to the location of one or more vehicles or persons, the direction of travel of the one or more vehicles or persons and a rate or speed of the one or more vehicles or persons.

The route optimization system 100 may have a network 112 that links the multiple entities to share information. The network 112 may be a Dedicated Short-Range Communication (DSRC) network, a local area network (LAN), a wide area network (WAN), a cellular network, the Internet, or combination thereof, that connects, couples and/or otherwise communicates among the multiple entities.

The route optimization system 100 collects, detects and determines various parameters, such as the density, locations and overall flow of vehicles 102a-b and/or pedestrians. The route optimization system 100 determines an optimal route that minimizes the overall time and/or distance to reach a destination location. The route optimization system 100 minimizes the amount of pedestrian and/or vehicle traffic that a pedestrian, a user and/or a vehicle 102a-b encounters when travelling from a start location, which may be a current location of the vehicle 102a-b or pedestrian, to the destination location. The optimal route maps a path between two or more locations that results in the least amount of time to traverse the route.

The route optimization system 100 may include or be retro-fitted or otherwise coupled with or coupled to one or more vehicles 102a-b. A vehicle 102a-b is a conveyance capable of transporting a person, an object, or a permanently or temporarily affixed apparatus. The vehicle 102a-b may be a self-propelled wheeled conveyance, such as a car, sports utility vehicle, truck, bus, van or other motor, battery or fuel cell driven vehicle. For example, the vehicle 102a-b may be an electric vehicle, a hybrid vehicle, a hydrogen fuel cell vehicle, a plug-in hybrid vehicle or any other type of vehicle that has a fuel cell stack, a motor and/or a generator. Other examples of vehicles include bicycles, trains, planes, or boats, and any other form of conveyance that is capable of transportation. The vehicle 102a-b may be semi-autonomous or autonomous.

Figure 2:
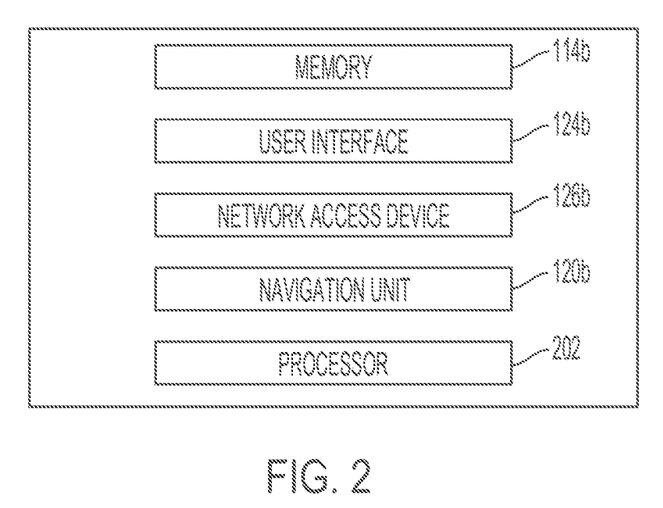
FIG. 2 is a block diagram of an example user device of the route optimization system of FIG. 1 according to an aspect of the invention.

The route optimization system 100 may have a route optimization apparatus 114 within one or more vehicles 102a-b, a user device 110, such as a personal device, a tablet, a personal computer, or a wearable device, and/or a route optimization platform 108 on a remote server, which may perform the route optimization for the pedestrian and/or the vehicle 102a-b. The route optimization apparatus 114 may be within, coupled to or otherwise connected to the vehicle 102*a-b* and/or connected to other vehicle components. The route optimization apparatus 114, user device 110 and/or the route optimization platform 108 may include one or more processors, such as an electronic control unit (ECU) 116, the processor 118 or the processor 202, as shown in FIG. 2 for example, and a memory 114*a-c*. The route optimization apparatus 114 may include other components, such as a navigation unit 120*a*, one or more vehicle sensors 122, a communication device 128, a network access device 126*a* and/or a user interface 124*a*. The route optimization apparatus 114 may couple, connect to, and/or include one or more vehicle components such as the motor and/or generator 130, the engine 132, the battery 134, and/or the battery management control unit (BMCU) 136.

The ECU 116 may be implemented as a single ECU or as multiple ECUs. The ECU 116 may be electrically coupled to some or all the other components within the vehicle 102*a-b*, such as the motor and/or generator 130, the engine 132, the battery 134, the battery management control unit (BMCU) 136, the memory 114*a*, the network access device 126*a* and/or one or more vehicle sensors 122. The ECU 116 may include one or more processors or controllers specifically designed for sensing, detecting, measuring and/or otherwise determining or obtaining the various parameters that impact determining the optimal path that accounts for both the pedestrian and/or vehicle traffic flow along the route. The ECU 116 may be coupled to a memory 114*a* and execute instructions that are stored on the memory 114*a*.

Similarly, the processors 118, 202 may be implemented as a single processor or as multiple processors. The processors 118, 202 may include one or more processors or controllers specifically designed for sensing, detecting, measuring and/or otherwise determining or obtaining the various parameters that impact determining the optimal path. The processor 202 may be coupled to the memory 114*b* and the processor 118 may be coupled to the memory 114*c*.

The memory 114*a* may be coupled to the ECU 116 and store instructions that the ECU 116 executes. Similarly, the memory 114*b* may be coupled to the processor 202 and store instructions that the processor 202 executes and the memory 114*c* may be coupled to the processor 118 and store instructions that the processor 118 executes. The one or more memories 114*a-c* may include one or more of a Random Access Memory (RAM) or other volatile or non-volatile memory. The one or more memories 114*a-c* may be a non-transitory memory or a data storage device, such as a hard disk drive, a solid-state disk drive, a hybrid disk drive, or other appropriate data storage, and may further store machine-readable instructions, which may be loaded and executed by the ECU 116, the processor 202, or the processor 118, respectively.

The route optimization apparatus 114 and/or the user device 110 may each include a user interface 124*a-b*, respectively. The route optimization system 100 may display one or more notifications, alerts and/or the optimal path on a map overlay that reduces or minimizes the pedestrian and/or vehicle traffic along the optimal path on the one or more user interfaces 124*a-b*. The one or more notifications on the user interfaces 124*a-b* may notify or suggest to the user or driver the optimal route or alert the user or driver of vehicles and/or pedestrians in proximity to the vehicle 102*a* and/or the user.

The user interfaces 124*a-b* may include an input/output device that receives user input, such as a user interface element, a button, a dial, a microphone, a keyboard, or a touch screen, and/or provides output, such as a display, a speaker, an audio and/or visual indicator, or a refreshable braille display. The user interfaces 124*a-b* may receive user input that may include configuration settings for one or more user preferences, for example.

The route optimization system 100 may include one or more network access device 126*a-d*. For example, the route optimization apparatus 114 within the one or more vehicles 102*a-b* includes a network access device 126*a*, the user device 110 includes a network access device 126*b* and the infrastructure device 106 may include a network access device 126*c*. The route optimization platform 108 may include a network access device 126*d*. The network access devices 126*a-d* may include a communication port or channel, such as one or more of a Dedicated Short-Range Communication (DSRC) unit, a Wi-Fi unit, a Bluetooth® unit, a radio frequency identification (RFID) tag or reader, or a cellular network unit for accessing a cellular network (such as 3G, 4G or 5G). The network access devices 126*a-d* may transmit data to and receive data from other entities, such as the user device 110, the infrastructure device 106, the external database 104 and/or the vehicles 102*a-b* via the network 112. In some implementations, the network access devices 126*a-d* may be used provide the current location of the device.

The route optimization apparatus 114 may include a communication device 128. The communication device 128 may include vehicle-to-infrastructure (V2I) communication that communicates with an infrastructure device 106. The communication device 128 may include vehicle-to-vehicle (V2V) communication that communicates with another vehicle 102*b* that is in proximity to the vehicle 102*a*. The communication device 128 communicates V2I and/or V2V to obtain the different parameters that may identify pedestrian and/or vehicle traffic flow.

The route optimization apparatus 114 may include a navigation unit 120*a* and the user device 110 may include a navigation unit 120*b*. The navigation unit 120*a* may be integral to the vehicle 102*a-b* or a separate unit coupled to the vehicle 102*a-b*, such as the navigation unit 120*b* of the user device 110. The navigation unit 120*b* may communicate with the vehicle 102*a-b* via the network access devices 126*a-b*. In some implementations, the vehicle 102*a-b* may include a Global Positioning System (GPS) unit (not shown) for detecting location data and date/time information instead of the navigation unit 120*a*. In that regard, the ECU 116 or the processor 202 may perform the functions of the navigation units 120*a-b* based on data received from the GPS unit. At least one of the navigation unit 120*a-b*, the ECU 116 or the processor 202 may predict or propose a route set that includes a starting location and a destination location. The navigation unit 120*a-b*, the ECU 116 or the processor 202 may perform navigation functions. Navigation functions may include, for example, route and route set prediction, providing navigation instructions, and receiving user input such as verification of predicted routes and route sets or destinations.

The navigation units 120*a-b* may provide and obtain navigational map information. The navigational map information may include a current location, a starting location, a destination location and/or a route between the starting location or current location and the destination location of the vehicle 102*a-b* or the user device 110, respectively, and may include a memory (not shown) for storing route data. The navigation unit 120*a-b* may receive data from other sensors capable of detecting data corresponding to location information. For example, the other sensors may include a gyroscope or an accelerometer.

The route optimization apparatus 114 may include one or more vehicle sensors 122 including a camera 122a, which may capture image data of surrounding vehicles 102b, or a proximity sensor 122b, which may detect surrounding vehicles 102b and/or pedestrians. The one or more vehicle sensors 122 may detect the location of the vehicles 102b and/or pedestrians. Similarly, the one or more infrastructure sensors 138 may be a camera, which may be used to capture image data, or a proximity sensor to detect vehicles 102a-b and/or pedestrians in the surrounding area. The location of the vehicles 102a-b and/or pedestrians may be used to determine the traffic density and/or the traffic flow in the surrounding area.

Similarly, the route optimization apparatus 114 and/or the user device 110 may use the navigation units 120a-b to provide the navigational map information including the current location of the vehicle 102a-b and/or user device 110. The route optimization system 100 may use the current location of the vehicles 102a-b and/or the user device 110 to determine pedestrian and/or vehicle traffic flow and density.

The route optimization system 100 may couple, connect to, and/or include one or more vehicle components. The one or more vehicle components may include a motor and/or generator 130. The motor and/or generator 130 may convert electrical energy into mechanical power, such as torque, and may convert mechanical power into electrical energy. The motor and/or generator 130 may be coupled to the battery 134. The motor and/or generator 130 may convert the energy from the battery 134 into mechanical power, and may provide energy back to the battery 134, for example, via regenerative braking. In some implementations, the vehicle 102a-b may include one or more additional power generation devices such as the engine 132 or a fuel cell stack (not shown). The engine 132 combusts fuel to provide power instead of and/or in addition to the power supplied by the motor and/or generator 130.

The battery 134 may be coupled to the motor and/or generator 130 and may provide electrical energy to and receive electrical energy from the motor and/or generator 130. The battery 134 may include one or more rechargeable batteries.

The BMCU 136 may be coupled to the battery 134 and may control and manage the charging and discharging of the battery 134. The BMCU 136, for example, may measure, using battery sensors, parameters used to determine the state of charge (SOC) of the battery 134. The BMCU 136 may control the battery 134 to maintain a reserve power explicitly for providing a sudden burst of electrical energy to be converted into power for the transmission to drive or move the multiple wheels of the vehicles 102a-b.

The route optimization system 100 may include or be coupled to the external database 104. A database is any collection of pieces of information that is organized for search and retrieval, such as by a computer, and the database may be organized in tables, schemas, queries, reports, or any other data structures. A database may use any number of database management systems. The external database 104 may include a third-party server or website that stores or provides information. The information may include real-time information, periodically updated information, or user-inputted information. A server may be a computer in a network that is used to provide services, such as accessing files or sharing peripherals, to other computers in the network.

The external database 104 may store and/or provide road and/or walkway information including one or more locations of road or walkway events, such as crosswalks, intersections, traffic signals, construction or other impediments or events in the road and/or walkway that affect the rate or direction of pedestrian traffic flow and/or vehicle traffic flow. In some implementations, the external database 104 may store and/or provide weather information including the temperature and any amount or type of participation. The weather information may be used along with the road and/or walkway information to determine an optimal path to arrive at the destination location from the start location.

The route optimization system 100 may include or be coupled to one or more infrastructure devices 106. The one or more infrastructure devices 106 may be positioned on a traffic signal, a building, a traffic pole, a road structure or other structure in proximity to a roadway, walkway or other thoroughfare near or in proximity to pedestrian and/or vehicle traffic flow.

The infrastructure device 106 may have an infrastructure sensor 138 and/or a network access device 126c. The infrastructure device 106 may use the infrastructure sensor 138 to detect, measure or otherwise determine the traffic flow and/or traffic density for vehicles and/or pedestrians, such as when one or more pedestrians waiting or crossing a crosswalk at a roadway. The infrastructure sensor 138 may be a camera, a proximity sensor, radar, lidar or other sensor that is capable of capturing data to determine the traffic flow and/or density. For example, the infrastructure sensor 138 may be a camera and capture image data, which may be analyzed to determine the traffic density or traffic flow at the roadway, walkway, intersection or crosswalk. In another example, the navigation units 120a-b may have or use a global positioning system (GPS) device that provides the location of the vehicles 102a-b and/or user devices 110, respectively, such that the locations of the vehicles 102a-b and/or users may be aggregated to determine the traffic flow and/or density.

The route optimization system 100 may include or be coupled to one or more other vehicles 102a-b. The route optimization system 100 may use the communication device 124 to communicate among the vehicles 102a-b to obtain vehicle data including the location of the other vehicles 102a-b or the sensor data from the other vehicles 102a-b. The vehicle data may include other sensor data obtained from the one or more other vehicles 102a-b, such as traffic density or image data. The vehicle 102b may include the route optimization apparatus 114, the one or more vehicle components and other similar components that perform similar functions as the vehicle 102a.

The route optimization system 100 may include a route optimization platform 108. The route optimization platform 108 may include the processor 118 and the network access device 126d. The route optimization platform 108 may perform the aggregation and/or collection of the sensor data and/or navigational map information from the various entities, such as the infrastructure device 106, the external database 104, the one or more vehicles 102a-b and/or the user device 110. The route optimization platform 108 may perform the analysis of the sensor data and/or navigational map information to determine the locations of the one or more vehicles 102a-b and the locations of the user devices 110 to identify pedestrian and/or vehicle traffic flow, rates and densities. Once the pedestrian and/or vehicle traffic flow is identified, the route optimization platform 108 may analyze the traffic flows and propose a route to provide to the one or more vehicle 102a-b and/or the one or more user devices 110 that minimizes the amount of time to traverse the route based on the traffic flows via the network access device 126d.

Figure 3:
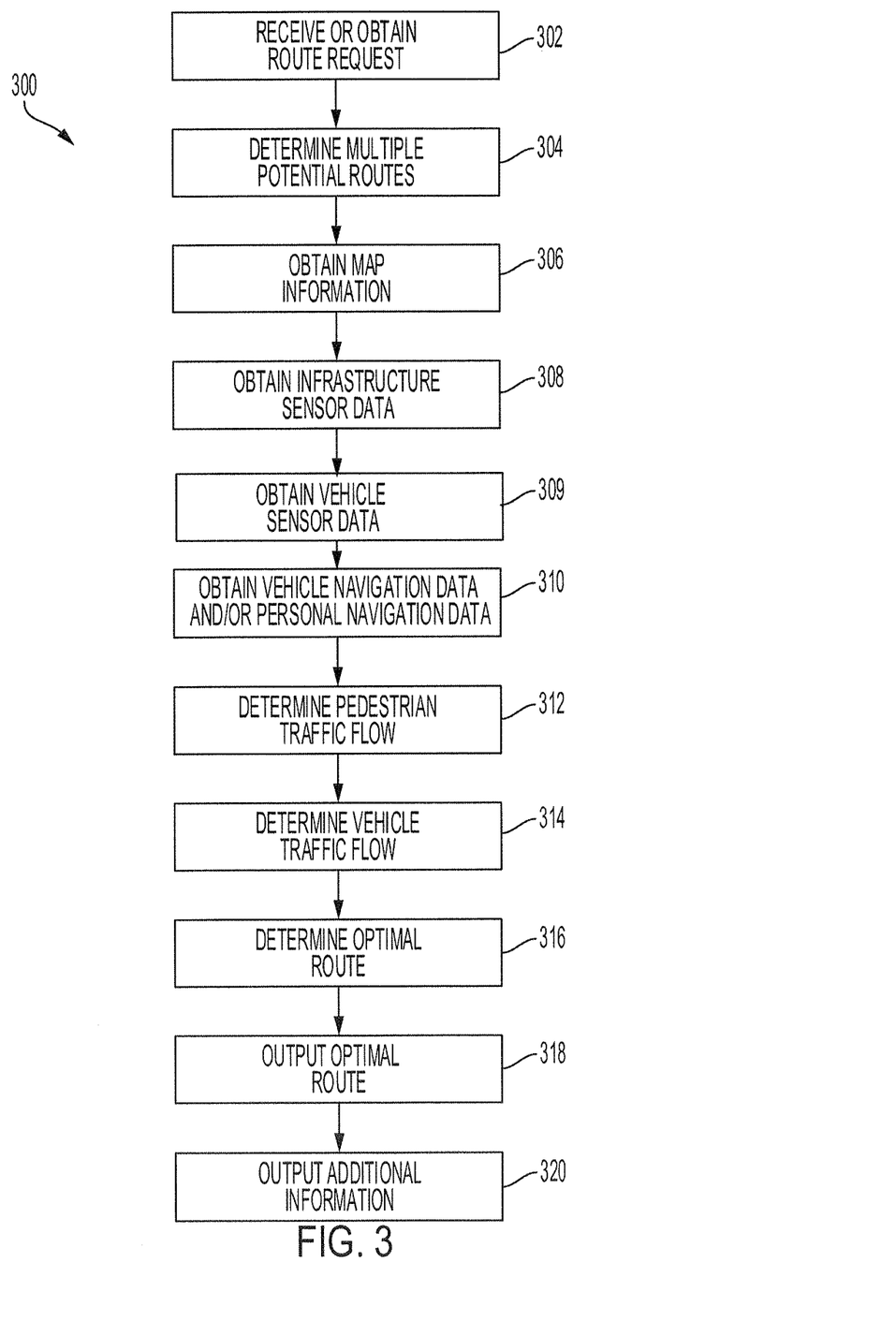
FIG. 3 is a flow diagram of an example process for outputting an optimal route using the route optimization system of FIG. 1 according to an aspect of the invention.

FIG. 3 is a flow diagram of a process 300 for determining and outputting an optimal path to navigate around pedestrian and/or vehicle traffic. One or more computers or one or more data processing apparatuses, for example, the ECU 116 of the route optimization apparatus 114, the processor 202 of the user device 110 and/or the processor 118 of the route optimization platform 108 of the route optimization system 100, appropriately programmed, may implement the process 300. The various entities within the route optimization system 100, i.e. the route optimization platform 108, the route optimization apparatus 114 and/or the user device 110, each or in combination with another entity may perform the function of determining and outputting the optimal path.

The route optimization system 100 may receive a route request from a user device 110 or a vehicle 102a (302). The route request is a request for an optimal route between a start location and a destination location that minimizes the overall amount of time required to traverse the optimized route. The optimized route factors in pedestrian traffic flow and/or vehicle traffic flow in proximity to, near and/or along a route when determining the optimal route. The route request may include the start location and/or destination location, a current location, and/or a current time. The start location may be the current location of the user device 110 or the vehicle 102a.

In some implementations, the route optimization system 100 may extract the route request from an electronic mail (e-mail), a calendar invite or appointment or other form of message or application. For example, the route optimization system 100 may identify from the calendar appointment that the user has a meeting at a restaurant. The route optimization system 100 may determine the current location as the start location and the address of the restaurant as the destination location and initiate the route request for an optimal route between the determined locations at a time slightly prior to the meeting time. Thus, the route optimization system 100 may provide the optimal route to the user on the user interface 124a-b without receiving user input to initiate the route planning.

Once the route request is received, the route optimization system 100 may determine multiple potential routes between the start location and the destination location (304). The route optimization system 100 may determine multiple potential routes from the start location to the destination location that traverse different roadways for the vehicle 102a or different walkways for the user of the user device 110. The route optimization system 100 may limit the multiple potential routes to potential routes that do not deviate from the shortest potential route a threshold amount of distance. For example, when the shortest potential route or most direct route from location "A" to location "B" is 5 miles, the route optimization system 100 may limit the multiple potential routes to potential routes that do not exceed 7 miles or a threshold of 2 miles more than the most direct route with respect to distance. This minimizes the number of combinations of the multiple potential routes and assists in reducing the use of computational resources.

These multiple routes may be used to select the optimal route and may be used to limit or minimize the amount of sensor data and/or navigation data that needs to be obtained to determine the pedestrian and/or vehicle traffic flow. In some implementations, the route optimization system 100 need only obtain the sensor data and/or navigation data along these multiple routes and/or within proximity of these multiple routes to determine the pedestrian and/or vehicle traffic flow that would affect the optimal route.

The route optimization system 100 may obtain map information related to the multiple routes (306). The route optimization system 100 may obtain the map information from one or more external databases 104. The map information may indicate roadways, walkways, wait events, such as a traffic signal where vehicles and/or pedestrians must wait before proceeding onward along their path, and one or more intersections of the roadways and walkways ("roadway/walkway intersection"). The roadway/walkway intersections are where a roadway, where a vehicle may traverse, intersects with a walkway, where a pedestrian may traverse, such as a crosswalk. The roadway/walkway intersection does not necessarily have to be a legal pedestrian path, such as a crosswalk, but may also be a path, such as from one curb of the roadway to the other curb of the roadway or to a medium, which is frequently traversed by pedestrians.

The route optimization system 100 may obtain infrastructure sensor data (308). The route optimization system 100 may collect the infrastructure sensor data from multiple infrastructure sensors 138 on multiple infrastructure devices 106 positioned on one or more structures, such as a traffic pole, traffic signal, building or other structures. The infrastructure device 106 may be positioned near crosswalks, intersections, roadways and/or walkways. The infrastructure device 106 may send the infrastructure sensor data to the route optimization platform 108, user device 110 and/or the route optimization apparatus 114 for analysis.

The infrastructure sensor data may include image data or other sensor data. The image data or other sensor data may be analyzed to determine the locations of one or more pedestrians and/or the locations of one or more vehicles 102a-b in proximity or within a threshold distance of the infrastructure device 106. The infrastructure sensor data may be captured over a period of time to determine the pedestrian and/or vehicle traffic flow.

The route optimization system 100 may obtain vehicle sensor data (309). The route optimization system 100 uses the one or more vehicle sensors 122 to detect or obtain the sensor data. The route optimization system 100 may detect or obtain the sensor data from multiple vehicles 102a-b. The sensor data may include image data captured using a camera 122a and/or proximity data detected using a proximity sensor 122b. The image data and/or the proximity data may be analyzed to determine the locations and the number of pedestrians and/or other vehicles 102b in proximity to or within a threshold distance of the vehicles 102a-b. The vehicle sensor data may be captured over a period of time to determine the pedestrian and/or vehicle traffic flow.

The route optimization system 100 may obtain the vehicle navigation data and/or the personal navigation data (310). The vehicle navigation data and/or the personal navigation data includes the location, the current time, the current direction of travel and/or the current rate or speed of travel of the vehicle 102a and/or the user device 110, respectively. In some implementations, the route optimization system 100 obtains the location and the current time of the vehicle 102a and/or the user device 110 over a period of time and uses the location and the current time to calculate or determine the direction of travel and/or the rate or speed of travel. The route optimization system 100 may also use the location and the current time of the vehicle 102a to determine an amount of time that the vehicle 102a or the user must wait at a location before proceeding further. When the route optimization system 100 obtains the location at two different times, the route optimization system 100 may use the two sets of points to form a vector that has both a direction of travel and a rate or speed of travel component. When the two sets of points have the same location, i.e., the user or the vehicle 102*a-b* has not moved, over the two different times, the route optimization system 100 may infer that the user or the vehicle 102*a-b* is waiting, either because of traffic or a traffic signal, for example. This may indicate a wait event.

The route optimization system 100 obtains the vehicle navigation data from multiple vehicles 102*a-b* and obtains the personal navigation data from multiple user devices 110. By collecting the vehicle navigation data and/or the personal navigation data from multiple sources, the route optimization system 100 collects the locations of both vehicles and pedestrians, which assists the route optimization system 100 to determine pedestrian and vehicle traffic flows during different times and over different periods of time.

The personal navigation data may relate to either the vehicle traffic flow or the pedestrian traffic flow. Since the personal navigation data is obtained from one or more user devices 110, the one or more user devices 110 may be on a person walking or on a person traveling within a vehicle 102*a-b*. The route optimization system 100 may calculate the speed of the person by extracting two or more locations of the user device 110 over two or more different times and dividing the distance between the two or more locations by the change in the different times. When the speed is greater than a threshold amount, such as greater than 8 mph, the route optimization system 100 may use the personal navigation data associated with the user device 110 to calculate the vehicle traffic flow. Whereas, when the speed is less than or equal to the threshold amount, the route optimization system 100 may use the personal navigation data associated with the user device 110 to calculate the pedestrian traffic flow.

The route optimization system 100 determines the pedestrian traffic flow (312). The route optimization system 100 may use the locations of the one or more user devices 110, the direction of travel or movement of the one or more user devices 110 and/or the rate and/or speed of the one or more user devices 110, which are associated with pedestrian traffic flow, to form the pedestrian traffic flow. Each location of a user device 110 may represent a single user. The route optimization system 100 may calculate the direction of travel and/or the rate and/or speed by forming a vector of the locations of the user device 110 at two different times, which provides both a direction component and a speed component for the pedestrian traffic.

The route optimization system 100 may determine the number or amount of user devices 110 that are in the same area, which may show the pedestrian traffic density in the area. The route optimization system 100 may compare the direction of travel and/or the rate and/or speed, e.g., the vector, of each of the one or more user devices 110 that are in the same area or within a threshold distance of each other. And, when a threshold number of the one or more user devices 110 are traveling in the same or similar direction of travel, the route optimization system 100 may determine that there is a group of pedestrians traveling in the same or similar direction of travel, which may indicate a direction of the pedestrian traffic flow. The rate or speed of travel of the pedestrian traffic flow may be the statistical mean, median, or average of the speed or rate of travel of the user devices 110 that are traveling in the same or similar direction of travel within a threshold distance of an area or each other.

The route optimization system 100 determines the vehicle traffic flow (314). The route optimization system 100 may use the locations of the one or more vehicles 102*a-b* and/or one or more user devices 110, the direction of travel or movement of the one or more vehicles 102*a-b* and/or one or more user devices 110 and/or the rate and/or speed of the one or more vehicles 102*a-b* and/or the one or more user devices 110, which are associated with vehicle traffic flow, to form the vehicle traffic flow.

Each location of a vehicle 102*a-b* and each location of a user device 110 associated with the vehicle traffic flow may represent a single vehicle 102*a-b*. In some implementations, the route optimization system 100 may disregard a user device 110 that is in the same location as the vehicle 102*a-b*, e.g., when a user device 110 is on a driver of the vehicle 102*a-b*, to determine distinct locations of the vehicles 102*a-b*.

Like the pedestrian traffic, the route optimization system 100 may form a vector of the locations of the user device 110 and/or the vehicles 102*a-b* at two different times, which provides both a direction component and a speed component for the vehicle traffic. The route optimization system 100 may determine the number or amount of distinct user devices 110 and vehicles 102*a-b* that are in the same area, which may show the vehicle traffic density in the area. The route optimization system 100 may compare the direction of travel and/or the rate and/or speed, e.g., the vector, of each of the one or more user devices 110 and/or vehicles 102*a-b* that are in the same area or within a threshold distance of each other. And, when a threshold number of the one or more user devices 110 and/or vehicles 102*a-b* are traveling in the same or similar direction of travel, the route optimization system 100 may determine that there is a group of vehicles 102*a-b* traveling in the same or similar direction of travel, which may indicate a direction of the vehicle traffic flow. The rate or speed of travel of the vehicle traffic flow may be the statistical mean, median, or average of the speed or rate of travel of the user devices 110 associated with the vehicles 102*a-b* and/or the vehicles 102*a-b* that are traveling in the same or similar direction of travel within a threshold distance of an area or each other.

Moreover, the route optimization system 100 may use a learned model or other machine learning algorithm to determine or model the pedestrian and/or vehicle traffic flow. Over time and from multiple collection sources, the route optimization system 100 may collect the locations of the user devices 110 and/or vehicles 102*a-b* and generate the learned model to model or predict pedestrian and/or vehicle traffic flow to further optimize route navigation. For example, the route optimization system 100 may use the learned model to identify and anticipate the times of the day that certain areas have heavy pedestrian and/or vehicle traffic flow, such as during rush hour or during lunch time at approximately 11:30 a.m.-1:30 p.m. in a downtown area, where there are restaurants and office buildings.

Figure 4:
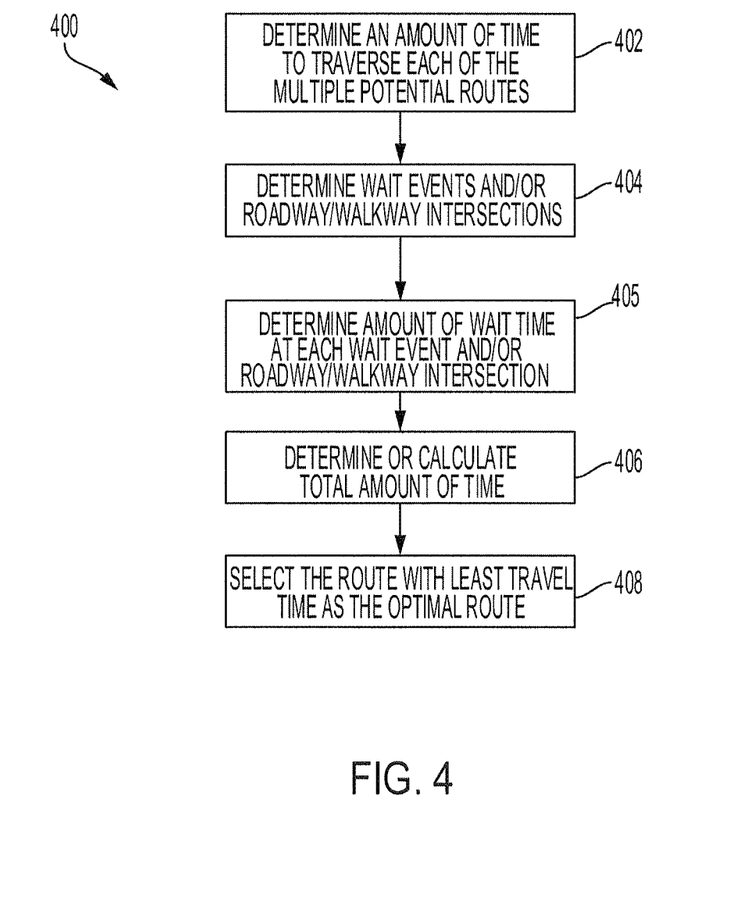
FIG. 4 is a flow diagram of an example process for determining the optimal route using the route optimization system of FIG. 1 according to an aspect of the invention.

Once the pedestrian traffic flow and the vehicle traffic flows are determined, the route optimization system 100 may determine an optimal route (316). The route optimization system 100 may select a route from the multiple potential routes as the optimal route from the start location to the destination location. The route optimization system 100 may select the route as the optimal route based on the pedestrian traffic flow, the vehicle traffic flow and/or the map information. FIG. 4 further describes the process to select the route from the multiple potential routes to determine the optimized route.

The route optimization system 100 may adjust the route in real-time, e.g., use the current location as the start location and continually update the route to the destination. For example, as a pedestrian walks down a walkway, the route optimization system 100 may provide the route to the pedestrian on their user device 110. As the pedestrian proceeds along the designated route, the route optimization system 100 may identify that the upcoming intersections and/or walkways have heavy pedestrian traffic flow and/or vehicle traffic flow along the route, which increases the time to traverse to the destination, and suggest a different route if the different route navigates around the heavy pedestrian traffic flow and/or vehicle traffic flow. For example, as a person is walking on one side of the street along the Las Vegas Strip, the route optimization system 100 may determine that there is heavy pedestrian traffic stuck at a traffic signal upfront, and the route optimization system 100 may suggest to the person to cross the street before the traffic signal and walk along the other side of the street.

In another example, as a vehicle 102a traverses a roadway, the vehicle 102a may need to wait at a traffic signal to allow pedestrians to cross and/or may need to turn onto another roadway, which intersects with the pedestrian traffic flow. The heavy pedestrian traffic flow and/or other vehicle traffic flow may impede the travel of the vehicle 102a resulting in a longer amount of time to traverse the roadway. Thus, the route optimization system 100 may suggest a different route that avoids the heavy pedestrian traffic flow.

In order to minimize the use of computer resources, the route optimization system 100 may calculate the pedestrian traffic flow and/or the vehicle traffic flow only along the multiple potential routes. Moreover, the route optimization system 100 may perform the route determination and collection of all the sensor data and/or navigational data on the route optimization platform 108 to minimize computing resource utilization on the vehicle 102a-b or the user device 110, and merely, leverage the components of the user device 110 or route optimization apparatus 114 or vehicle 102a-b to minimize costs.

After the optimal route is determined, the route optimization system 100 outputs the optimized route to the user (318). The route optimization system 100 outputs the optimal route, e.g., on a map overlay that shows the roadways and/or walkways, on at least one of the user interface 124a of the route optimization apparatus 114 or the user interface 124b of the user device 110 to the user interface 124a-b where the route request was received. For example, when a driver inputted the route request via the user interface 124a, the route optimization system 100 may provide or output the optimized route on the same user interface 124a.

The route optimization system 100 may output additional information to the user (320). The additional information may include the location of one or more user devices 110 that represent pedestrian users and/or drivers of the vehicles 102a-b and/or the location of one or more vehicles 102a-b. For example, the route optimization system 100 may display a map with the current location of the vehicle 102a, the optimized route and/or the location of nearby user devices 110 carried by pedestrians on the surrounding roadways and/or walkways on the user interface 124a-b. In another example, the route optimization system 100 may output an audio tone or a visual indicator when there are other users in proximity to the vehicle 102a-b or vehicles 102a-b in proximity to the pedestrian, such as at a corner of an intersection and/or within a blind spot.

The additional information may include the pedestrian traffic flow and/or vehicle traffic flow along the optimal route and identify specific areas of high congestion or traffic. The route optimization system 100 may use different colors, such as a green, yellow and red, to highlight areas of low, medium or high traffic flow or density, respectively, along the optimal route on the map overlay. In some implementations, the route optimization system 100 may highlight the traffic density at a high-level, such as using the different colors on the map overlay, but when the route optimization system 100 receives user input, such as a swipe or finger motion, the route optimization system 100 may zoom into a particular location to display or show the additional information, such as distinct vehicles 102a-b and/or pedestrians with user devices 110. Then, when the route optimization system 100 receives a different user input, the route optimization system 100 may zoom out to show the overall traffic density at the high-level.

FIG. 4 is a flow diagram of a process 400 for determining the optimal route from among multiple potential routes. One or more computers or one or more data processing apparatuses, for example, the ECU 116 of the route optimization apparatus 114, the processor 202 of the user device 110 and/or the processor 118 of the route optimization platform 108 of the route optimization system 100, appropriately programmed, may implement the process 300.

The route optimization system 100 determines an amount of time traverse each of the multiple potential routes (402). The amount of time to traverse each of the multiple potential routes is based on the pedestrian and/or vehicle traffic flow that intersects with and/or is along the route. The route optimization system 100 may calculate the total distance to traverse each route of the multiple potential routes. The route optimization system 100, for each route, may divide the distance by an average walking speed, a current walking speed or the rate or speed of the pedestrian traffic flow along the route when the user is walking, e.g., traveling less than a threshold speed or the location is located on a walkway, to determine the amount of time to traverse the route. The route optimization system 100 may, similarly, for each route, divide the distance by an average vehicle speed, a current vehicle speed or the rate or speed of the vehicle traffic flow along the route when the user is driving, e.g., traveling greater than or equal to the threshold speed or the location is located on a roadway, to determine the amount of time to traverse the route.

Once the amount of time is initially determined, the route optimization system 100 may determine one or more wait events and/or roadway/walkway intersections from the map information and/or locations of the one or more user devices 110 and/or the vehicles 102a-b (404). When the locations of the one or more user devices 110 and/or the vehicles 102a-b remain at a standstill for a period of time or when the map information indicates that the location is a wait event and/or roadway/walkway intersection, the route optimization system 100 may determine that the location is a wait event and/or roadway/walkway intersection.

The route optimization system 100 may determine the amount of time that the one or more user devices 110 and/or the vehicles 102a-b remain at each wait event and/or roadway/walkway intersection along the route (405). The amount of time may include the time required for the traffic signal to cycle through one or more cross/go signals before the user or vehicle 102a-b is able to traverse across the crosswalk or through the intersection, respectively. The traffic signal may require multiple cycles through the one or more signals if there is a significant or large density of people or vehicles 102a-b at the location of the crosswalk or intersection, respectively. The route optimization system 100 may obtain the amount of time for each cycle of the traffic signal from a traffic database or other external database 104. In some implementations, the amount of time may be based on a learned model from previously collected data along the route or similar route during past or previous days. The learned model may be generated using artificial intelligence, e.g., a machine learning algorithm that uses a neural network. The route optimization system 100 utilizes the learned model to understand the pedestrian and/or vehicle traffic flow patterns at different locations throughout the data, e.g., the traffic density at various locations along with the wait times or amount of time that the traffic is at a standstill, at the different locations throughout a day.

Figure 5:
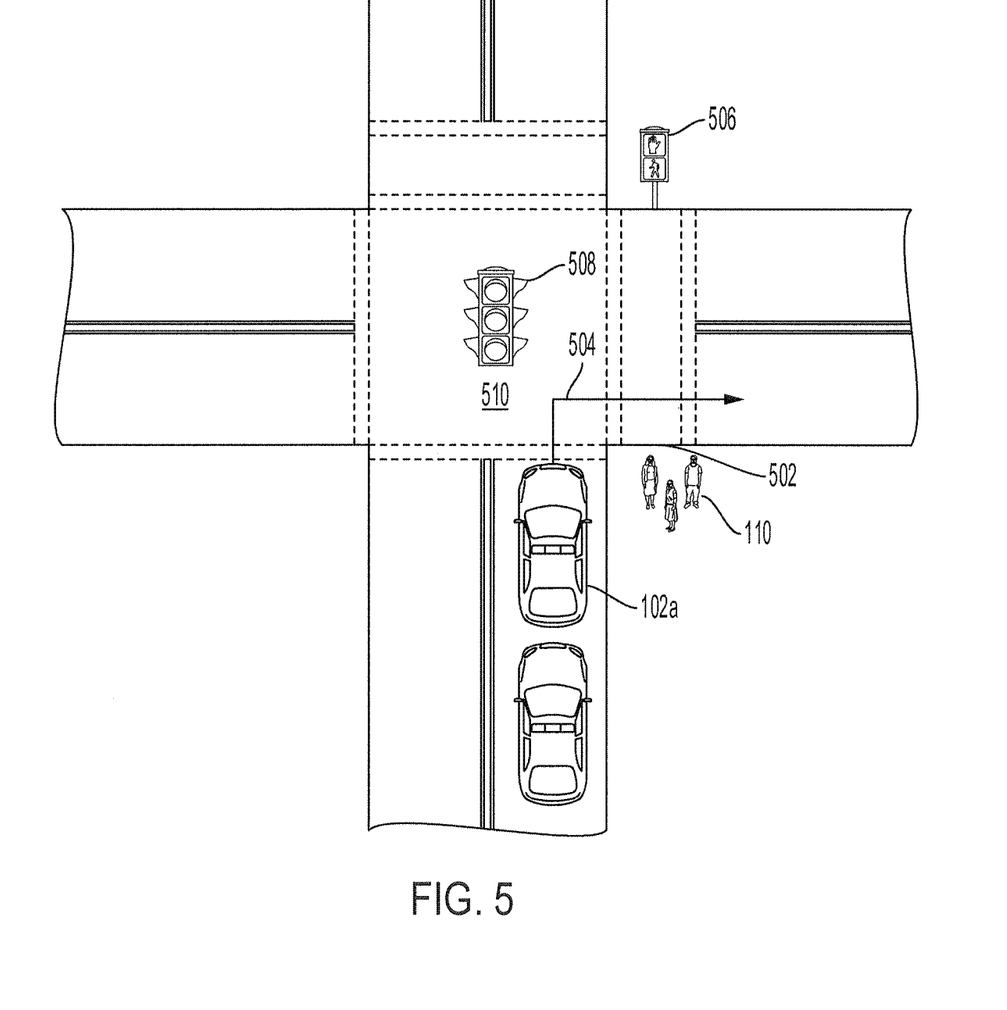
FIG. 5 shows an example use case of the traffic flow of a vehicle or pedestrian being interrupted by other pedestrian or vehicle traffic flow according to an aspect of the invention.

There may be various reasons for the wait event. Pedestrians holding one or more user devices 110 may have to wait for a crosswalk traffic signal 506 to change to cross the street in a crosswalk 502, as shown in FIG. 5 for example. In another example, cross-traffic, such as a vehicle 102a turning right on the path 504, across a crosswalk 502, may cause the pedestrian holding the user device 110 to wait at the edge of an intersection 510 before crossing the crosswalk. Moreover, vehicle 102a, which is making a right turn along the path 504, must wait for the vehicle traffic signal 508 and for any pedestrian traffic in the crosswalk 502 to clear before proceeding on the path 504. These instances would require the route optimization system 100 to adjust the measurements or values used for the vehicle and/or pedestrian traffic flow when determining the optimal route.

The route optimization system 100 may calculate a total amount of time to traverse each route of the multiple potential routes (406). The total amount of time to traverse each route may be a sum of the total wait time for the route, i.e., a sum of the wait time for each wait event and/or roadway/walkway intersection along the route, and the initial amount of time to traverse the route.

The route optimization system 100 orders the routes of the multiple potential routes based on the total amount of time to traverse the route and may select the route with the least total time as the optimal route (408). In some implementations, the route optimization system 100 may present two or more routes of the multiple potential routes as an optimal route to the user via the one or more user interfaces 124a-b and allow the user to select one of the two or more routes as the optimal route.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A route optimization system, comprising:
   a sensor located on an object or included within an electronic device and being configured to detect a location of one or more pedestrians; and
   a processor coupled to the sensor and configured to:
   obtain a start location and a destination location for a vehicle or a personal device,
   determine pedestrian traffic flow between the start location and the destination location based on the location of the one or more pedestrians,
   determine a plurality of routes between the start location and the destination location,
   determine an optimal route among the plurality of routes based on the pedestrian traffic flow, and
   provide the optimal route to a user.

2. The route optimization system of claim 1, wherein the processor is configured to:
   determine a vehicle traffic flow between the start location and the destination location; and
   determine the optimal route further based on the vehicle traffic flow.

3. The route optimization system of claim 1, further comprising:
   a plurality of user devices of a plurality of pedestrians configured to provide a plurality of locations of the plurality of user devices;
   wherein the processor is configured to:
   obtain the plurality of locations of different users of the plurality of user devices, and
   determine the pedestrian traffic flow further based on the plurality of locations of the different users.

4. The route optimization system of claim 1, wherein the sensor is an infrastructure sensor that is configured to detect the location of the one or more pedestrians at a crosswalk or an intersection.

5. The route optimization system of claim 1, wherein the processor is configured to:
   determine an estimated travel time for each of the plurality of routes based on the pedestrian traffic flow;
   wherein to determine the optimal route the processor is configured to:
   select a route among the plurality of routes with the estimated travel time that is less than all the other estimated travel times of the other routes among the plurality of routes.

6. The route optimization system of claim 1, further comprising:
   a display configured to display the optimal route on a map overlay;
   wherein the processor is configured to render, on the display, the location of the one or more pedestrians on the map overlay.

7. The route optimization system of claim 1, wherein the pedestrian traffic flow includes a direction and rate of travel of each of the one or more pedestrians based on the location of each of the one or more pedestrians, wherein the processor is configured to:
   determine whether each route of the plurality of routes encounters the pedestrian traffic flow based on the route and the direction and the rate of travel of each of the one or more pedestrians; and
   calculate a total estimated travel time for each of the plurality of routes based on the pedestrian traffic flow that is encountered.

8. The route optimization system of claim 1, wherein the processor is an electronic control unit, wherein the sensor is located on the vehicle and the electronic control unit is included within the vehicle, wherein the start location and the destination location are for the vehicle.

9. The route optimization system of claim 1, wherein the processor and the sensor are included within the personal device and the personal device is a wearable device, wherein the start location and the destination location are for the wearable device.

10. A route optimization system, comprising:
    a sensor located on an object or included within an electronic device and being configured to detect a location of one or more pedestrians;
    a plurality of user devices of a plurality of pedestrians configured to provide a plurality of locations of the plurality of user devices; and
    a processor coupled to the sensor and the plurality of user devices and configured to:

obtain a start location and a destination location for a vehicle or a user device, determine pedestrian traffic flow between the start location and the destination location based on the location of one or more pedestrians and the plurality of locations of the plurality of user devices, determine a plurality of routes between the start location and the destination location, determine an optimal route among the plurality of routes based on the pedestrian traffic flow, and provide the optimal route to a user.

11. The route optimization system of claim 10, wherein the processor is configured to:

determine a vehicle traffic flow between the start location and the destination; and determine the optimal route further based on the vehicle traffic flow.

12. The route optimization system of claim 10, wherein the sensor is an infrastructure sensor that is configured to detect the location of the one or more pedestrians at a crosswalk or an intersection that intersects one or more of the plurality of routes.

13. The route optimization system of claim 10, further comprising:

determine an estimated travel time for each of the plurality of routes based on the pedestrian traffic flow;

wherein to determine the optimal route the processor is configured to select a route among the plurality of routes with the estimated travel time that is less than all the other estimated travel times of the other routes among the plurality of routes.

14. The route optimization system of claim 10, further comprising:

a display configured to display the optimal route on a map overlay;

wherein the processor is configured to render, on the display, the location of the one or more pedestrians on the map overlay.

15. The route optimization system of claim 10, wherein the pedestrian traffic flow includes a direction and rate of travel of each of the one or more pedestrians based on the location of each of the one or more pedestrians, wherein the processor is configured to:

determine whether each route of the plurality of routes encounters the pedestrian traffic flow based on the route and the direction and the rate of travel of each of the one or more pedestrians; and adjust an estimated travel time for each of the plurality of routes based on the pedestrian traffic flow.

16. The route optimization system of claim 10, wherein the processor is an electronic control unit and the sensor is located on the vehicle and the electronic control unit is included within the vehicle, wherein the start location and the destination location are for the vehicle.

17. A method for optimizing navigation, comprising:

obtaining, by a processor of an electronic device and from a plurality of devices, a plurality of locations of the plurality of devices;

obtaining, by the processor of the electronic device, a start location and a destination location for a vehicle or a personal device;

determining, by the processor of the electronic device, pedestrian traffic flow and vehicle traffic flow between the start location and the destination location based on the plurality of locations of the plurality of devices;

determining, by the processor of the electronic device, an optimal route among a plurality of routes based on the pedestrian traffic flow and the vehicle traffic flow; and providing, by the processor of the electronic device, the optimal route to a user.

18. The method of claim 17, further comprising:

obtaining, by the processor of the electronic device and from a plurality of vehicles, a plurality of locations of the plurality of vehicles, wherein determining the pedestrian traffic flow and the vehicle traffic flow is further based on the plurality of locations of the plurality of vehicles.

19. The method of claim 17, further comprising:

rendering, by the processor of the electronic device and on a display, a location of one or more pedestrians on a map overlay.

20. The method of claim 17, further comprising:

determining, by the processor of the electronic device, a plurality of routes between the start location and the destination location;

determining, by the processor of the electronic device, an estimated travel time for each of the plurality of routes based on the pedestrian traffic flow; and selecting, by the processor of the electronic device, a route among the plurality of routes with the estimated travel time that is less than all the other estimated travel times of the other routes among the plurality of routes.

* * * * *